United States Patent [19]

McClure

[11] 3,926,804

[45] Dec. 16, 1975

[54] FLUID FILTRATION AND SAMPLING

[75] Inventor: Charles Laird McClure, Malvern, Pa.

[73] Assignee: Pro-Tech Inc., Malvern, Pa.

[22] Filed: Oct. 7, 1974

[21] Appl. No.: 512,515

Related U.S. Application Data

[62] Division of Ser. No. 262,221, June 13, 1972, Pat. No. 3,840,123.

[52] U.S. Cl. ....................... 210/76; 210/77; 210/82
[51] Int. Cl.² ........................................ B01D 33/06
[58] Field of Search ......... 210/76, 82, 85, 167, 391, 210/415, 411, 433, 434, 77, 413

[56] References Cited
UNITED STATES PATENTS

| | | | |
|---|---|---|---|
| 788,511 | 5/1905 | Besseberg | 210/391 X |
| 2,243,585 | 5/1941 | Towler et al. | 210/391 X |
| 3,574,509 | 4/1971 | Zentis et al. | 210/415 |
| 3,618,767 | 11/1971 | Thummel | 210/82 X |

*Primary Examiner*—John Adee
*Attorney, Agent, or Firm*—Charles A. McClure

[57] ABSTRACT

Continuously self-cleaning fluid filtration is provided, especially for use in systems of fluid sampling wherein recirculation of part of the fluid filtered thereby is by-passed back through in the reverse direction to clean it. The filter has a foraminous housing that also has end ports to the exterior and has rotatable internal baffling dividing the interior into compartments communicating with the respective ports.

6 Claims, No Drawings

FLUID FILTRATION AND SAMPLING

This is a division, of application Ser. No. 262,221, filed June 13, 1972, now U.S. Pat. No. 3,340,123.

This invention relates to self-cleaning fluid filter means and to operation thereof, particularly in systems of fluid sampling such as are utilized in efforts at pollution abatement, industrial waste control, and environmental law enforcement.

Sampling of fluid media, whether liquid or gaseous, is becoming increasingly important, such as for determination of the composition thereof or of contaminants therein. Manual techniques for sampling a medium are giving way to automatic sampling equipment, and while it may be important to pass most contaminants so as to assure representative samples, it also is necessary to prevent the sampler intake from becoming clogged to such an extent that sampling cannot continue.

Such situation is especially troublesome in sampling of polluted waterways, and while the present invention may be applied to treatment of gaseous medium, the following discussion will center about its application to liquids, usually but not necessarily aqueous. Typical clogging materials include fabric, paper, vegetation, and fibrous components thereof.

A primary object of the present invention is a nonclogging filtration method.

Another object is use of such filtration method in a system of fluid sampling.

A further object is provision of continuously self-cleaning filter means for use in accomplishing the foregoing objects.

Other objects of this invention, together with means and methods for attaining the various objects, will be apparent from the following description and the accompanying diagrams.

Figure 3A:
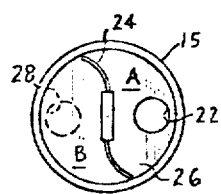
Figure 3B:
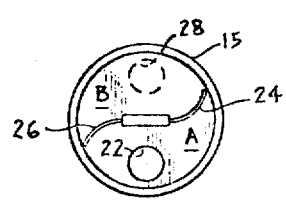
Figure 3C:
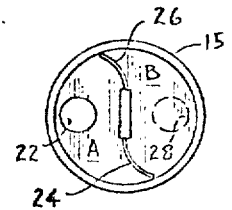
Figure 2:
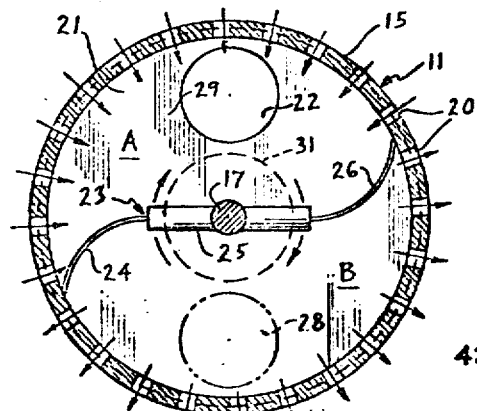
FIG. 2 is a transverse section of the same apparatus, taken at II—II on FIG. 1.

FIG. 3a, 3b, and 3c are schematic end views of the apparatus of FIG. 2 at successive stages in its operation.

Figure 4:
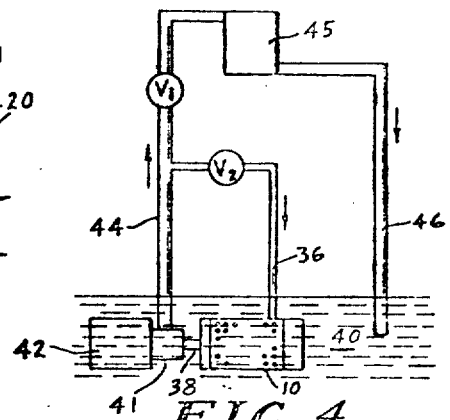

FIG. 4 is a schematic view of the same apparatus as used in a sampling system according to the invention.

In general, the objects of the present invention are accomplished, especially in methods of fluid sampling, by filter means comprising a foraminous housing also having end ports to the exterior and having therein rotatable means dividing the interior into compartments communicating with the respective ports. More particularly, the housing is preferably cylindrical, with a foraminous cylindrical wall, having therein an axially and radially extending divider contiguous with opposite sides of the inside surface of the housing cylindrical wall and having at each end a baffle rotatable with the divider and contiguous with the wall surface and with the divider so as to form two rotatable compartments, the baffles having one opening each therein to establish communication with the respective compartments.

The method of utilizing such foraminous filtration means according to this invention lies in establishing both influx and efflux paths through different portions thereof, progressively interchanging the respective paths, forcing fluid to be filtered along the influx path therethrough, and diverting a portion of the filtered liquid and forcing it along the efflux path therethrough to dislodge any clogging material deposited during previous use as an influx path. The foraminous means is preferably stationary, and the progressive interchange of influx and efflux paths is gradual, with the respective paths each occupying about one half of the foraminous means at any given time.

Figure 1:
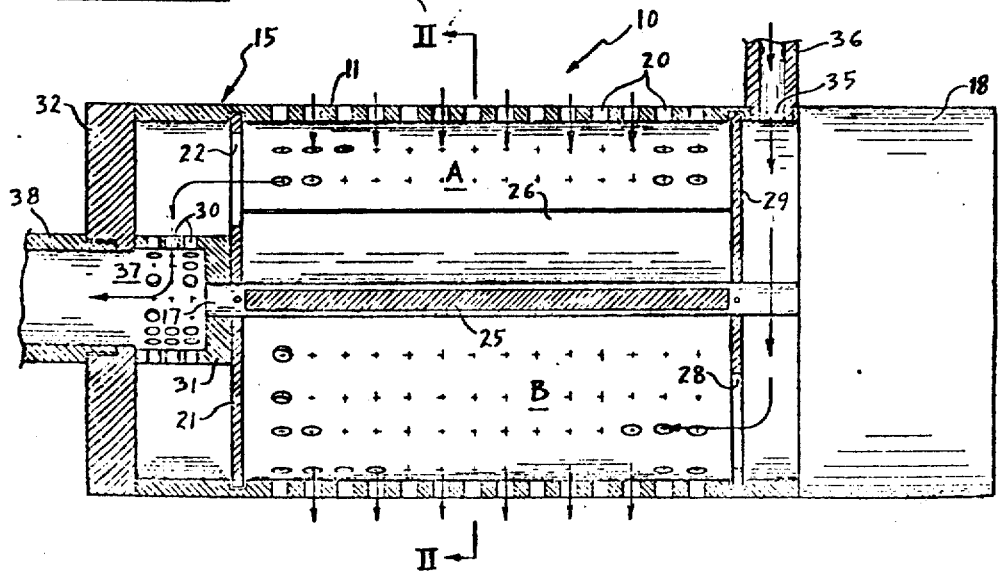
FIG. 1 is a side elevation, partly sectioned or cut away, of filter means according to the present invention.

FIGS. 1 and 2 show self-cleaning filter means 10 of this invention sectioned longitudinally and transversely, respectively. Housing 11 has cylindrical wall 15 having multiplicity of openings 20 therethrough and divided into two compartments (A and B) bounded at their opposite ends by baffles 21 and 29, which extend radially to the inside surface of the wall. Baffle 21 has opening 22 therethrough communicating with compartment A, and baffle 29 has opening 28 therethrough communicating with compartment B.

Divider 23, which is mounted for rotation on shaft 17 of motor 18 (conventional in structure and, thus, not sectioned). The motor shell closes one end of the housing. The divider includes rigid central strip 25 extending from baffle to baffle on the motor shaft and flexible vanes 24 and 26 extending laterally from the strip to terminate in wiping contact with the inside surface of the foraminous cylindrical wall. Baffle 29 is spaced from the motor end of the housing, and lateral end port 35 through the housing wall opens into the resulting space and has external conduit 36 connected thereto. Pedestal 31 extends axially into the housing through opposite end wall 32 to baffle 21 and provides bearing support for the end of motor shaft 17, which extends into the end of the pedestal. The cylindrical wall of the pedestal has openings 30 therethrough, and its interior communicates with the exterior of the housing via axial end port 37 to which conduit 38 is interconnected.

Inasmuch as housing 11 is fixed in position, while motor 18 rotates shaft 17 and divider 23 carried thereon, compartments A and B revolve about the housing axis. FIGS. 3a, 3b, and 3c show diagrammatically successive positions of the divider, which is ogee-shaped in end view, and of the compartments (and their respective baffle openings) at intervals of one-quarter turn. So whereas, in FIG. 2, compartment A with communicating opening 22 in baffle 21 is located above the axis, in FIG. 3a it is to the right, in FIG. 3b underneath, and in FIG. 3c to the left, corresponding to clockwise rotation of the motor shaft and the divider as so viewed. Similarly, opening 28 (which is indicated in phantom because it is above the plane of the view) occupies successive positions diametrically opposite relative thereto.

Regardless of such continual change in position of the compartments as the motor shaft rotates, each of the compartments remains in communication with the exterior of the chamber via its respective port. As indicated by arrows, the direction of flow is from the exterior into compartment A, and from compartment B to the exterior, through the foraminous cylindrical wall of the housing. Accordingly, as the compartment divider rotates, the direction of flow progressively reverses at locations moving about the cylindrical wall. along the trailing edges of the flexible vanes. The outflow from compartment B through the foraminous cylindrical wall tends to dislodge from the outside surface thereof (and from the openings therethrough whatever fibrous, particulate, or other material was filtered or screened out thereby during previous inflow therethrough into compartment A.

FIG. 4 illustrates a fluid circuit utilizing such self-cleaning filter means 10 according to this invention.

Pump 41, which may be of centrifugal type, is driven by motor 42. Together with the filter means, the pump and motor are submerged in body of liquid 40. Conduit 38 from the filter means is connected to the pump intake, and main conduit 44, which contains valve $V_1$, leads from the pump exhaust to liquid sampler 45. Bypass conduit 36, which contains valve $V_2$, branches from the main conduit (and connects to side port 35 of the filter means as shown in FIG. 1 and previously described). Waste conduit 46 leads from the sampler back to the body of liquid.

Operation of this apparatus is readily understood. When pump 41 is operating it withdraws liquid from compartment A of the filter means, such liquid having been filtered or screened to exclude material incapable of passing from the exterior to the interior through the foraminous wall, which acts as a filter or screen during such inflow from the body of liquid. The withdrawn liquid is pumped into main conduit 44 and toward liquid sampler 45. Valve $V_1$ in the main conduit and valve $V_2$ in bypass conduit 36, which branches therefrom, are adjusted so that an appreciable part of the liquid is diverted into the bypass conduit and back to the filter means. The bypassed liquid enters compartment B therein and flows outward through the foraminous wall of the housing and tends to dislodge any clogging material on the exterior surface. Inasmuch as such bypassed liquid has been filtered by its previous inflow through such foraminous wall, its outflow therethrough does not tend to clog the openings therein by depositing any appreciable material against the inside wall.

Motor 18, which rotates divider 23 to provide the continual interchange of compartments A and B relative to the foraminous housing wall, operates at a slow rate, preferably on the order of a half dozen to about one and a half dozen revolutions per minute. The preferred speed depends upon the concentration of potentially clogging material in the body of liquid relative to the size of openings in the foraminous wall, but speeds of 10 to 12 r.p.m. usually will prove suitable. Sleevelike screens of various mesh sizes may be provided to slip over the housing wherever it is desired to filter out finer materials than the openings in the housing itself will screen out. The self-cleaning action provided according to this invention will be effective on such screens, as well.

The materials of construction are such as will be unaffected by the chemical composition of the liquid being sampled. Numerous synthetic resins are suitable, such as polyvinyl chloride, for example. Corrosion-resistant metals may be used, as well, such as stainless steel, high-silicon steel, beryllium bronze, and the like. The flexible vanes of the compartment divider may be made of nylon except where acid solutions are encountered; neoprene is favored for use with such solutions. Other appropriate materials or combinations thereof will be readily apparent to persons having ordinary skill in the art.

Liquid-sampling apparatus for use as described may be designed to take discrete samples or composite samples and may be operated electrically, by pressurized fluid, or other motive power or combination thereof. The internal design of the sampler is relatively immaterial, as nearly any such device will benefit from use according to this invention, and many thereof are well known in the art. The self-cleaning filter means may be used likewise with any other equipment requiring a supply of filtered fluid.

Although a specific apparatus embodiment has been shown and described, some permissible modifications therein have been mentioned. Others may be made, as by adding, combining, or subdividing parts or steps, or substituting equivalents, while retaining such substantial benefits of this invention, which itself is defined in the following claims.

I claim:

1. Liquid sampling comprising withdrawing liquid from a body thereof, filtering the withdrawn liquid through cylindrical foraminous means by establishing therewithin at least one influx compartment and at least one efflux compartment, admitting the withdrawn liquid radially into the influx compartment through a portion of the foraminous means intermediate the body of liquid and the influx compartment and thereby filtering the admitted liquid, exhausting such filtered liquid in an axis-paralleling direction from the influx compartment, collecting a sample of the filtered withdrawn liquid, recirculating withdrawn liquid in the opposite direction through the foraminous means by admitting into the efflux compartment in an axis-paralleling direction withdrawn filtered liquid not so collected, exhausting such liquid radially from the efflux compartment through a portion of the foraminous means intermediate the efflux compartment and the body of liquid, and interchanging the respective compartments and their contiguous portions of the foraminous means and thereby backflushing such means.

2. Method of filtering fluid through cylindrical foraminous means, comprising establishing therewithin at least one influx compartment and at least one efflux compartment, admitting radially into the influx compartment fluid from a surrounding body thereof through a portion of the foraminous means intermediate the surrounding body of fluid and the influx compartment and thereby filtering the admitted fluid, exhausting such filtered fluid in an axis-parallelling direction from the influx compartment, admitting into the efflux compartment in an axis-paralleling direction fluid that is clean relative to the body of fluid to be filtered, exhausting such fluid radially from the efflux compartment through a portion of the foraminous means intermediate the efflux compartment and the surrounding body of fluid, and interchanging the respective compartments and their contiguous portions of the foraminous means and thereby backflushing such means.

3. Filtering method according to claim 2, wherein the interchanging step is performed by revolving the respective compartments slowly relative to the foraminous means.

4. Filtering method according to claim 3, wherein the rate of revolution is on the order of 10 to 12 per minute.

5. Filtering method according to claim 2, including establishing adjacent opposite ends of the foraminous means respective end compartments, one at each end, and establishing fluid flow from the influx compartmet to one end compartment and fluid flow from the other end compartment to the efflux compartment.

6. Filtering method according to claim 5, including the step of withdrawing filtered fluid from the first end compartment and forwarding part of it elsewhere but bypassing the rest of it back to the other end compartment.

* * * * *

UNITED STATES PATENT OFFICE
CERTIFICATE OF CORRECTION

Patent No. 3,926,804  Dated December 16, 1975

Inventor(s) Charles Laird McClure

It is certified that error appears in the above-identified patent and that said Letters Patent are hereby corrected as shown below:

On the cover sheet the notation "No drawings" should read -- 6 Drawing Figures--.

The sheet of drawing containing Figures 1-3c shown on the attached sheet should be added.

Signed and Sealed this eighth Day of June 1976

[SEAL]

Attest:

RUTH C. MASON
Attesting Officer

C. MARSHALL DANN
Commissioner of Patents and Trademarks